United States Patent [19]

Koesashi et al.

[11] Patent Number: 4,859,123
[45] Date of Patent: Aug. 22, 1989

[54] INSERT BORING TOOL

[75] Inventors: Yuzo Koesashi; Yasuhiko Kawade; Yoshikazu Iwata, all of Gifu, Japan

[73] Assignee: Mitsubishi Kinzoku Kabushiki Kaisha, Tokyo, Japan

[21] Appl. No.: 107,431

[22] Filed: Oct. 13, 1987

[30] Foreign Application Priority Data

Apr. 25, 1987 [JP] Japan .............................. 62-63315[U]
Oct. 8, 1987 [JP] Japan ............................ 62-154518[U]

[51] Int. Cl.$^4$ .............................................. B23B 51/00
[52] U.S. Cl. .................................... 408/233; 408/227; 408/231; 408/713
[58] Field of Search ................................ 408/227–233, 408/713, 715

[56] References Cited

U.S. PATENT DOCUMENTS 4,230,429 10/1980 Eckle .................................... 408/228
4,265,574 5/1981 Eckle .
4,268,198 5/1981 Peters .
4,303,358 12/1981 Grusa ................................... 408/229
4,556,345 12/1985 Philippi .

FOREIGN PATENT DOCUMENTS 54-120487 9/1979 Japan .
625443A5 5/1981 Switzerland .
1480027 10/1977 United Kingdom .

OTHER PUBLICATIONS

Werkstatt und Betrieb 114 (1981) 2, pp. 103–106, Von Dipl. -Ing. G. Striegl.
European Search Report, 9-1-88.

Primary Examiner—Bruce Y. Arnold
Assistant Examiner—Jay Ryan
Attorney, Agent, or Firm—Cushman, Darby & Cushman

[57] ABSTRACT

An insert boring tool includes radially outward and inward cutting inserts mounted thereon. The radially outward and inward inserts are arranged such that end cutting edges of the respective inserts are intersected with each other at a point of intersection in loci of rotation of the respective inserts in a plane containing an axis of a tool body. The radially outward and inward inserts are positioned such that, assuming that a radial distance between the point of intersection and a radially outermost end of the end cutting edge of the radially outward insert is A, and a radial distance between the point of intersection and a radially innermost end of the end cutting edge of the radially inward insert is B, a ratio of A/B takes a value of from 2/8 to 45/55.

10 Claims, 12 Drawing Sheets

INSERT BORING TOOL

BACKGROUND OF THE INVENTION

1. Field of the Invention

The present invention relates to an insert boring tool comprising a tool body and radially outward and inward cutting inserts provided at a forward end of the tool body.

2. Prior Art

Figure 1:
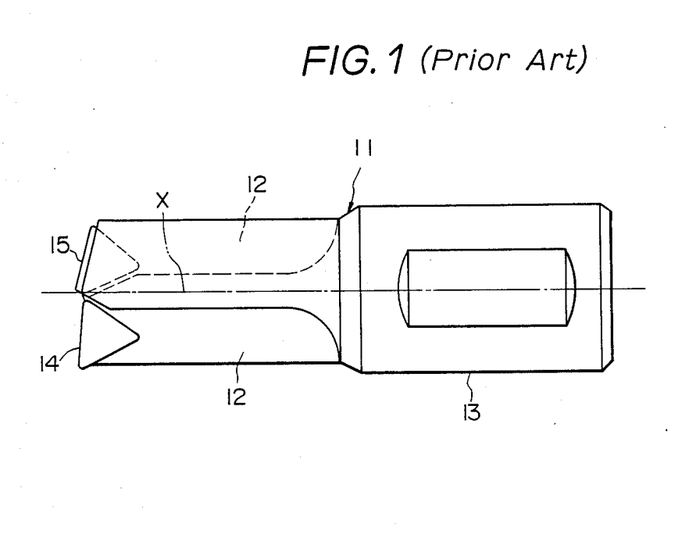
FIG. 1 is a side elevational view of a conventional insert boring tool.
Figure 2:
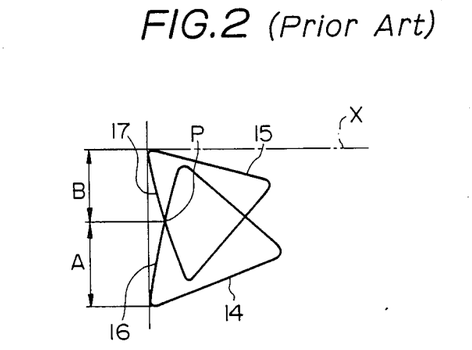
FIG. 2 is an imaginary view showing the positional relationship between loci of rotation of respective radially outward and inward inserts illustrated in FIG. 1.

A conventional boring tool of the kind referred to above will be described with reference to FIGS. 1 through 4 of the accompanying drawings. As shown in FIG. 1, the insert boring tool has a tool body 11 which is provided with two chip discharging flutes or grooves 12 and 12. These chip discharging flutes 12 and 12 extend axially from a forward end of the tool body 11 toward a rear portion thereof which serves as a shank 13. A radially outward cutting insert 14 generally in the form of a regular triangle as viewed in plan is detachably secured at a forward end of one of the chip discharging flutes 12 and, likewise, a radially inward cutting insert 15 in the form of a regular triangle as viewed in plan is detachably secured at a forward end of the other chip discharging flute 12. These radially outward and inward inserts 14 and 15 are so arranged as to have their respective loci of rotation shown in FIG. 2, in a plane containing an axis X of the tool body 11. Specifically, the radially outward and inward inserts 14 and 15 are arranged such that an end cutting edge 16 of the radially outward insert 14 is intersected at a point of intersection P with an end cutting edge 17 of the radially inward insert 15. Further, the radially outward and inward inserts 14 and 15 are positioned such that, assuming that a radial distance between the point of intersection P and a radially outermost end of the end cutting edge 16 of the radially outward insert 14 is A, and a radial distance between the point of intersection P and a radially innermost end of the end cutting edge 17 of the radially inward insert 15 is B, A/B becomes equal to 48/52 to 1/1.

The insert boring tool as describe above is fed forwardly while being rotated about the axis X, to cause the radially outward and inward inserts 14 nd 15 to perform a boring.

Figure 3:
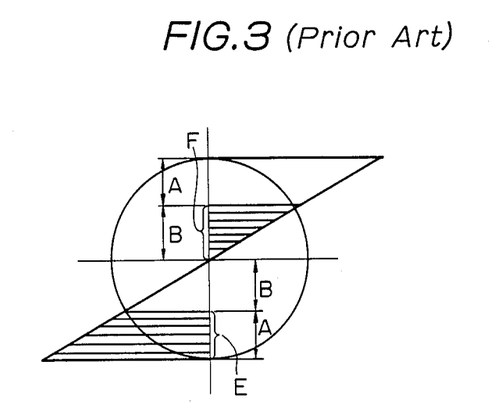
FIG. 3 is a view showing a distribution of principle forces acting respectively on the inserts illustrated in FIG. 1.
Figure 4:
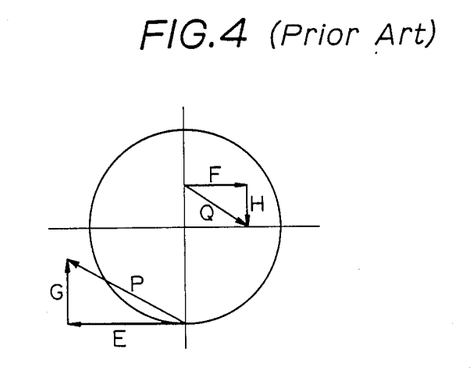
FIG. 4 is a view showing resultant cutting forces acting respectively on the inserts illustrated in FIG. 1.

Since the arrangement of the above-described insert boring tool is such that the radially outward and inward 14 and 15 overlap each other in their respective loci of rotation, only portions of their respective end cutting edges 16 and 17, that is, only regions A and B participate in the cutting. For this reason, the principal force distribution during boring takes the form shown in FIG. 3 in which a principal force E acting on the radially outward insert 14 and a principle force F acting on the radially inward insert 15 have the relationship of $E/F \approx 3/1$. Further, a back force G acting on the radially outward insert 14 and a back force H acting on the radially inward insert 15 have the relation of $G \approx H$. As a result, as shown in FIG. 4, the relationship between a resultant cutting force P of the principal force E and the back force G applied to the radially outward insert 14 and a resultant cutting force Q of the principal force F and the back force H applied to the radially inward insert 15 becomes $P \approx 3.1 Q$, causing an extreme unbalance therebetween. This makes the cutting unstable, and deteriorates boring accuracy, finished surface roughness and bore straightness. Specifically, since the tool body 11 is liable to lean in the direction of the resultant cutting force P, Q, the hole formed by the tool may have a diameter smaller than the outer diameter of the tool at its deep portion, thereby lowering a boring depth limit.

SUMMARY OF THE INVENTION

It is therefore an object of the present invention to provide an insert boring tool which can increase boring accuracy, finished surface roughness and bore straightness, and also improve a boring depth limit.

According to the invention, there is provided an insert boring tool comprising a tool body having an axis of rotation therethrough, a radially outward cutting insert in the form of a polygon as viewed in plan, the radially outward insert being mounted on an forward end of the tool body and located adjacent an outer periphery of the forward end, the radially outward insert having at least one end cutting edge, and a radially inward cutting insert in the form of a polygon as viewed in plan, the radially inward insert being mounted on the forward end of the tool body and located adjacent the axis of the tool body, the radially inward insert having at least one end cutting edge, wherein the radially outward and inward inserts are arranged such that the end cutting edge of the radially outward insert is intersected at a point of intersection with the end cutting edge of the radially inward insert, in loci of rotation of the respective radially outward and inward inserts in a plane containing the axis of the tool body, and wherein the radially outward and inward inserts are positioned such that, assuming that a radial distance between the point of intersection and a radially outermost end of the end cutting edge of the radially outward insert is A, and a radial distance between the point of intersection and a radially innermost end of the end cutting edge of the radially inward insert is B, a ratio of A/B takes a value of from 2/8 to 45/55.

DESCRIPTION OF THE PREFERRED EMBODIMENTS OF THE INVENTION

Various embodiments of the invention will be described in detail with reference to FIGS. 5 through 24.

Figure 5:
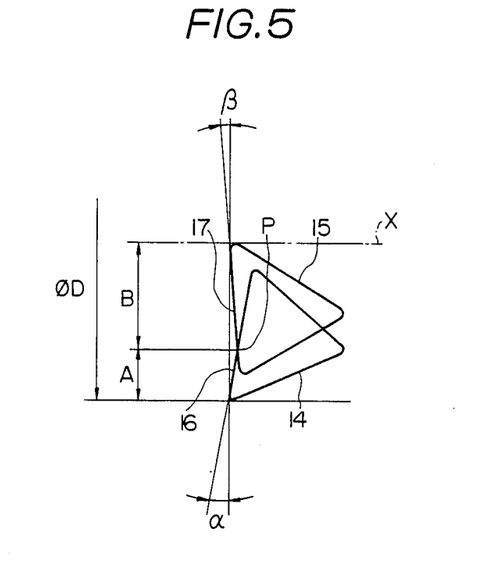
FIG. 5 is an imaginary view showing the positional relationship between loci of rotation of respective radially outward and inward inserts mounted on an insert boring tool according to a first embodiment of the invention.
Figure 6:
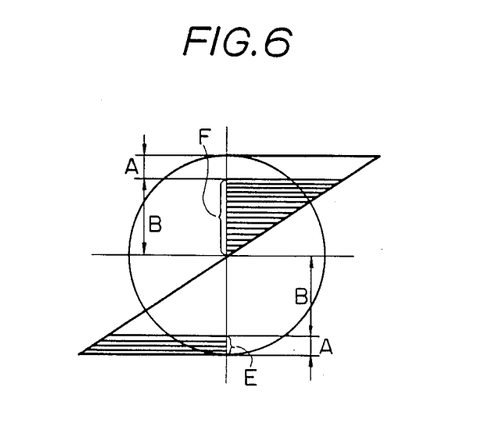
FIG. 6 is a view showing a distribution of principal faces acting respectively on the inserts illustrated in FIG. 5.
Figure 7:
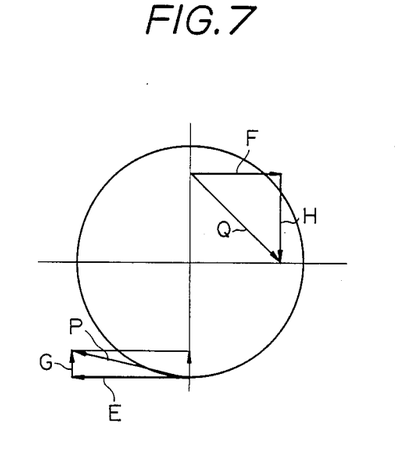
FIG. 7 is a view showing resultant cutting forces acting respectively on the inserts illustrated in FIG. 5.

Referring first to FIGS. 5 through 7, there is illustrated radially outward and inward cutting inserts or throw-away tips 14 and 15 of an insert boring tool according to a first embodiment of the invention. In FIGS. 5 through 7, like reference numerals are used to designate parts and components like or similar to those illustrated in FIGS. 1 through 4, and the description of such like or similar parts and components will therefore be omitted to avoid duplication.

FIG. 5 imaginarily shows loci of rotation of the respective radially outward and inward inserts 14 and 15 in a plane containing the axis X of the tool body of the boring tool. The radially inward insert 15 has the end cutting edge 17 which has a radially innermost end located substantially on the axis X of the tool body. The radially outward and inward inserts 14 and 15 are arranged such that the end cutting edge 16 of the radially outward insert 14 is intersected at the point of intersection P with the end cutting edge 17 of the radially inward insert 15. Further, the radially outward and inward inserts 14 and 15 are positioned such that, assuming that the radial distance between the point of intersection P and the radially outermost end of the end cutting edge 16 of the radially outward insert 14 is A, and the radial distance between the point of intersection P and the radially innermost end of the end cutting edge 17 of the radially inward insert 15 is B, A:B is almost equal to 3:7. In FIG. 5, the character D designates an outer cutting diameter of the insert boring tool, and $\alpha$ and $\beta$ respectively denote angles of inclination of the respective end cutting edges 16 and 17.

In this manner, by virtue of the fact that the radially outward and inward inserts 14 and 15 shown in FIG. 5 are so positioned as to satisfy the relationship of $A/B \approx 3/7$, the principal force E acting on the radially outward insert 14 and the principal force F acting on the radially inward insert 15 during the boring take the form shown in FIG. 6 in which $E \approx F$. As a result, as shown in FIG. 7, the resultant cutting force P of the principal force E and the back force G applied to the radially outward insert 14, and the resultant cutting force Q of the principal force F and the back force H applied to the radially inward insert 15 can be brought to $P \approx Q$ and can substantially be balanced with each other, enabling the cutting to be performed in a stable manner. Thus, it is possible to increase the boring accuracy, the finished surface roughness and the bore straightness. Further, since the back force G acting on the radially outward insert 14 is small, its locus of rotation is liable to expand radially outwardly of the tool body, and therefore the diameter of a bore formed by the tool does not fall below a desired diameter even in the deepest portion of the bore, thus improving the boring depth limit.

Although in the above boring tool, the ratio A/B is set to be almost equal to 3/7, it may be modified. However, the ratio has to be within the range of 2/8 to 45/55. Such range has been set on the basis of the following boring tests.

BORING TEST 1

A test insert drill bit having a ratio A/B of 43/57 was prepared, and subjected to the boring test, which was conducted under the following conditions:

Gauge diameter: 24.671 mm
Feed rate: 0.15 mm/rev.
Cutting speed: 120 m/min.
Workpiece: JIS. S45C (Hardness HB: 200 to 240)

Figure 8:
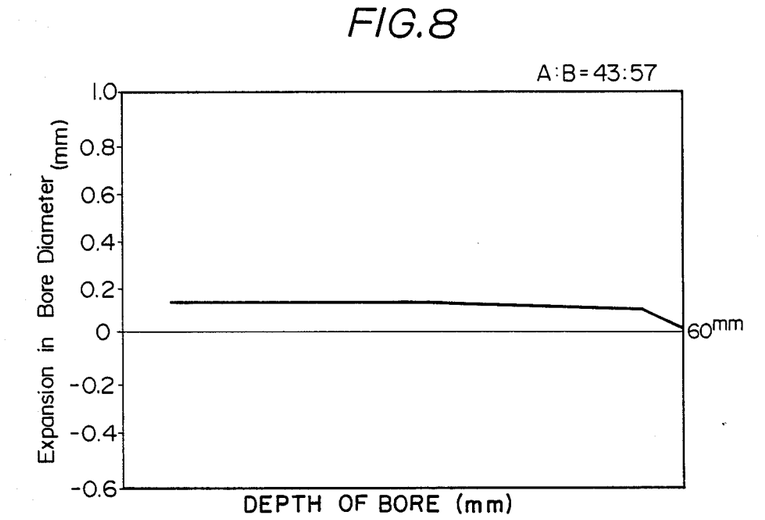
FIG. 8 is a graph showing a relationship between diameters of a hole formed by a test tool and depths of the hole.

In the foregoing, the gauge diameter is defined by a diameter of a circle generated by the radially outermost end of the end cutting edge 16 of the radially outward insert 14. In the test, the diameters of a bore drilled by the drill bit were measured and plotted against its depths, and the result is shown in FIG. 8.

Figure 9:
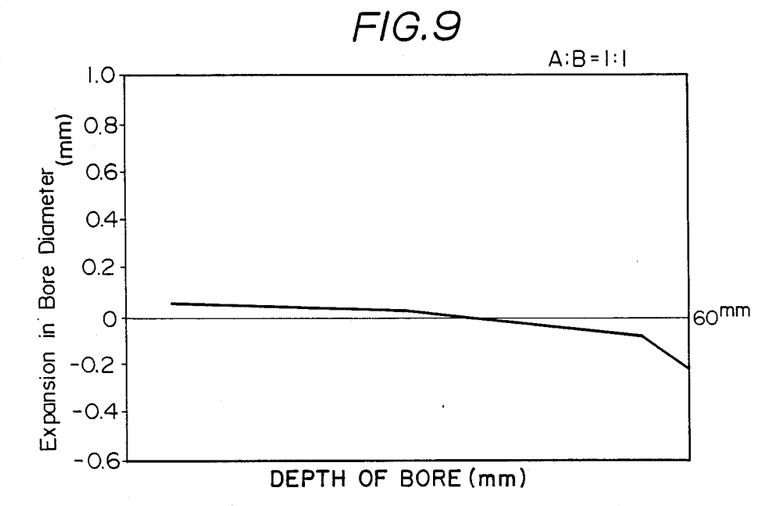
FIGS. 9 to 11 are respectively graphs similar to FIG. 8.

Further, for comparison purposes, a conventional drill bit having a ratio A/B of 1/1 was employed, and the same test was conducted under the same conditions. The result is shown in FIG. 9.

As clearly seen from FIGS. 8 and 9, the diameter of the bore formed by the drill bit with the ratio A/B of 43/57 does not fall below the gauge diameter even in the deepest portion of the bore, but the diameters of the bore formed by the conventional drill having the ratio A/B of 1/1 are substantially smaller than the gauge diameter in the deepest portion of the bore. This is because the locus of rotation of the cutting edge becomes narrower radially inwardly of the bit body in the conventional drill bit since the back force acting on the radially outward insert is great when that portion of its end cutting edge which actually cuts the workpiece is long. And, the inventors have considered that even if a drill bit has a A/B ratio slightly greater than 43/57, the diameters of a bore formed by the drill bit would be within the admissible range, and that the upper limit of the ratio should be set as to be 45/55.

BORING TEST 2

Figure 10:
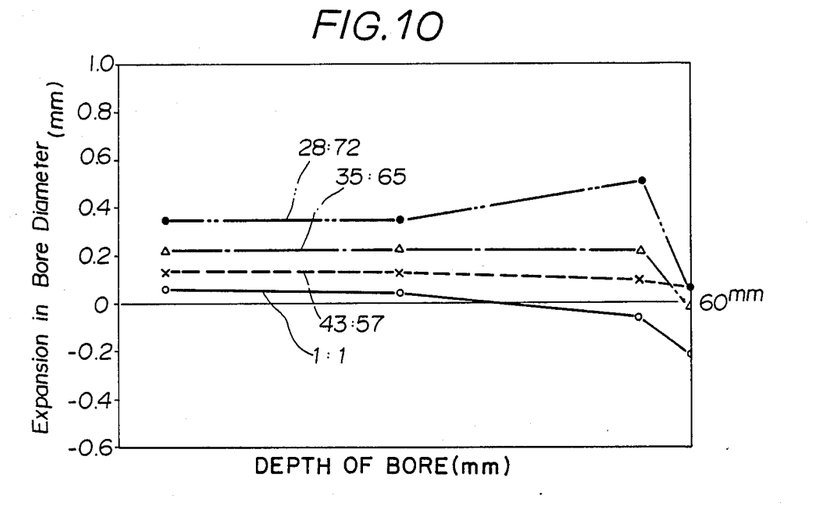

Various drill bits having various ratios ranging from 28/72 to 1/1 were prepared, and the boring tests were conducted. The results are shown in FIG., 10 in which the diameters of a bore drilled by each drill bit were plotted against its depths. In the tests, the ratio was varied by changing of the inclination angle of the radially inward insert, and therefore the gauge diameters are slightly different from each other. The other conditions were set so as to be the same as those in BORING TEST 1. Further, the boring tests by using such similar various drill bits were also conducted under the same conditions as the above other than the feed rate of 0.2 mm/rev.. The results are shown in FIG. 11.

Figure 11:
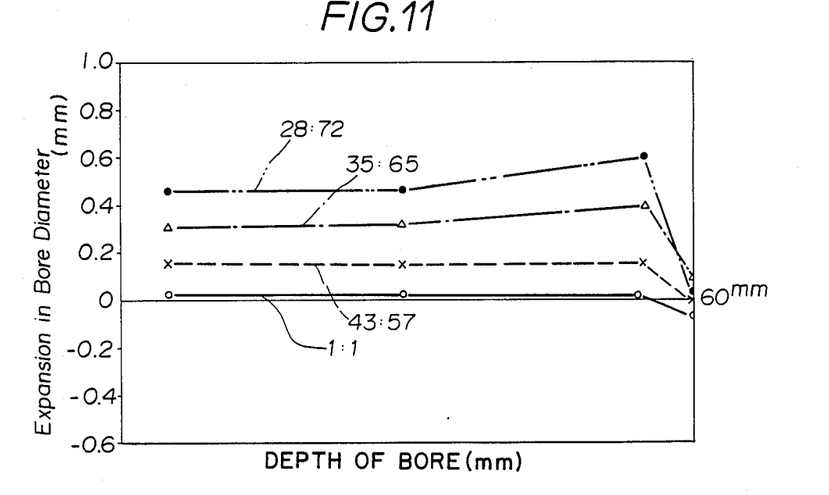

As seen from FIGS. 10 and 11, the diameters of the bore at its deep portion are increased as the ratio A/B becomes smaller than 1/1, and the deviation from the gauge diameter is 0.5 mm or 0.6 mm when the ratio A/B is 28/72, which is smallest. This is because the back force acting on the radially outward cutting insert is reduced, and thus the locus of rotation of the cutting insert expands radially outwardly of the drill bit body. The inventors considered that the above deviation 0.6 mm is the maximum admissible value, and that even if a drill bit has a A/B ratio slightly smaller than 28/72, the deviation of the diameters of a bore would not exceed 0.6 mm. As a result, the lower limit of the ratio was set as to be 2/8.

Figure 12:
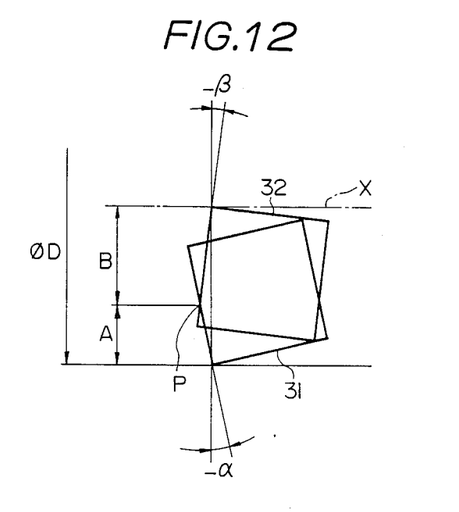
FIG. 12 is a view similar to FIG. 5, but showing a second embodiment of the invention.

FIG. 12 illustrates a second embodiment of the invention in which radially outward and inward inserts 31 and 32 generally in the form of a square as viewed in plan are employed in substitution for the radially outward and inward inserts 14 and 15 shown in FIG. 5 which are in the form of a regular triangle.

Figure 13:
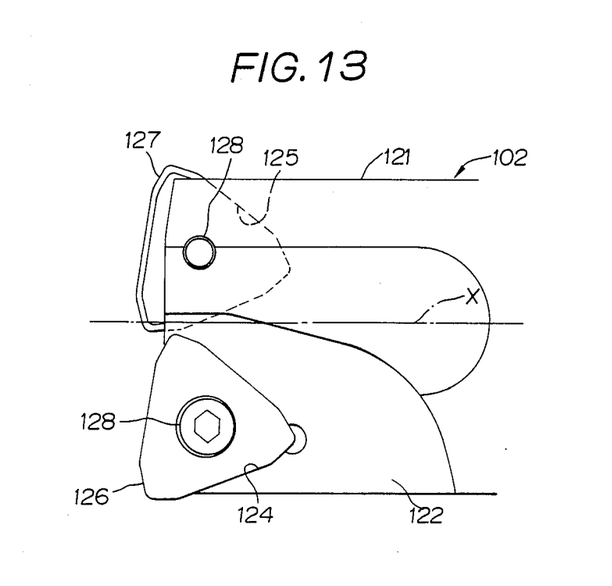
FIG. 13 is a fragmental side elevational view of an insert boring tool according to a third embodiment of the invention.
Figure 14:
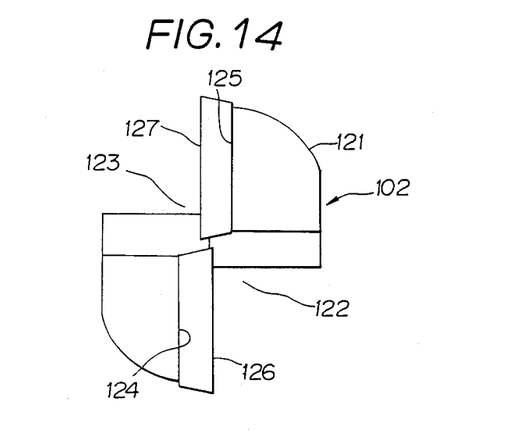
FIG. 14 is an axially front end view of the boring tool illustrated in FIG. 13.

FIGS. 13 through 21 illustrate a third embodiment of the invention. Referring particularly to FIGS. 13 and 14, an insert boring tool 102 comprises a tool body 121. The tool body 121 is provided with two chip discharging flutes 122 and 123 which extend rearwardly from a forward end of the tool body 121. Insert seats or recesses 124 and 125 are formed respectively at forward ends of surface portions of the respective chip discharging flutes 122 and 123, which surface portions are oriented in the rotational direction of the boring tool 102. Radially outward and inward cutting inserts 126 and 127, which are identical in size and configuration with each other and which are generally in the form of a regular triangle as viewed in plan, are fastened and secured respectively to the insert seats 124 and 125 by respective fastening bolts 128 and 128.

Figure 15:
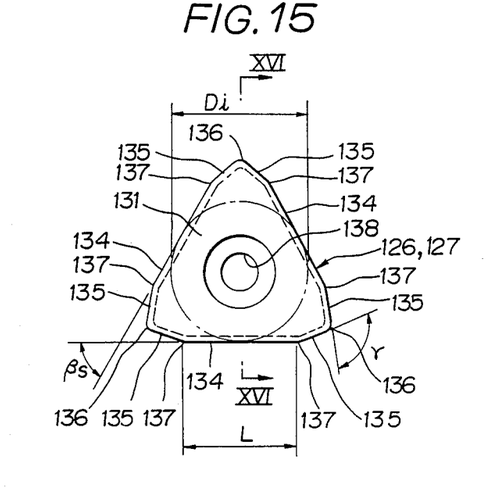
FIG. 15 is a plan view of one of radially outward and inward inserts illustrated in FIG. 13.
Figure 16:
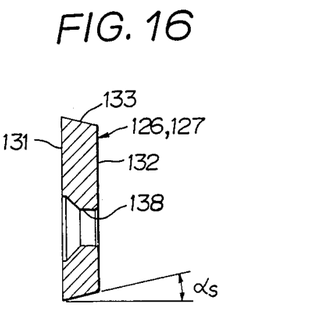
FIG. 16 is a cross-sectional view taken along the line XVI—XVI in FIG. 15.
Figure 18:
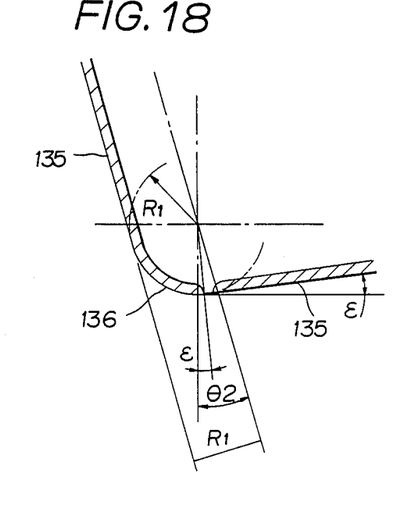
FIG. 18 is a fragmental enlarged view of a portion encircled by XVIII in FIG. 17.

As clearly shown in FIGS. 15 and 16, each of the radially outward and inward inserts 126 and 127 is a positive cutting insert generally in the form of a regular triangle as viewed in plan, and has an upper planar surface 131 serving as a face, a lower surface 132 parallel to the upper surface 131 and serving as a seat face, and a side surface 133 extending between an outer periphery of the upper surface 131 and an outer periphery of the lower surface 132 and serving as a flank. A clearance angle $\alpha_s$ of the side surface 133 is set to 5° to 15°. Three sides of the regularly triangular upper surface 131 are formed respectively into side cutting edges 134, 134 and 134. A pair of adjacent nose cutting edges 135 and 135 are formed in a V-shape at each of apexes of the regular triangle. Each pair of adjacent nose cutting edges 135 and 135 are in symmetrical relation to the bisector of a corresponding one of the apexes of the regular triangle, and define a nose angle $\gamma$ larger than the apex angle $\beta_s = 60°$ of the regular triangle. It is preferable to set the nose angle to 100° to 120°. In the illustrated embodiment, the nose angle $\gamma$ is set to 100°. A nose rounded cutting part 136 is formed at an intersection of each pair of adjacent nose cutting edges 135. The nose rounded cutting part 136 is set to have its radius of curvature R1 (see FIG. 18) that is 0.4 to 1.2 mm. On the other hand, it is desirable that the length L of each of the side cutting edges 134 is set to 40% to 60% of $3^{\frac{1}{2}}D_i$ where $D_i$ is a diameter of an inscribed circle of the three side cutting edges 134, 134 and 134. In the illustrated embodiment, the length L is set to 50% of $3^{\frac{1}{2}}D_i$. A rounded cutting part 137 is formed at an intersection of each side cutting edge 134 and the adjacent nose cutting edge 135, and has a radius of curvature of 0.2 to 0.8 mm. Each of the radially outward and inward inserts 126 and 127 is provided with a fixing through bore 138 extending from the upper surface 131 to the lower surface 132.

The arrangement of the above-mentioned radially outward and inward inserts 126 and 127 will next be described with reference to FIG. 17 which shows loci of rotation of the respective radially outward and inward inserts 126 and 127 in a plane containing the axis X of the tool body 121.

Figure 17:
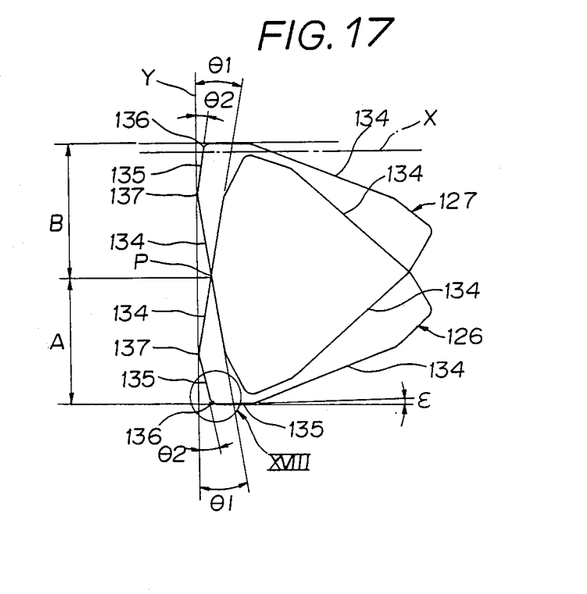
FIG. 17 is an imaginary view showing the positional relationship between loci of rotation of the respective radially outward and inward inserts illustrated in FIG. 13.

In FIG. 17, the radially inward insert 127 is so arranged that one of the side cutting edges 134 and the adjacent nose cutting edge 135 located radially inwardly of the side cutting edge 134 through the intermedium of the corresponding rounded cutting part 137 serve as an end cutting edge, and the rounded cutting part 137 is located forwardly of the adjacent side and rounded cutting edges 134 and 135 with reference to the axis X. In addition, the radially inward insert 127 is also arranged such that the nose rounded cutting part 136 adjacent the nose cutting edge 135 serving as the end cutting edge is located beyond the axis X in an over-centered manner. It is desirable that an angle $\theta_1$ of the side cutting edge 134 with respect to an imaginary forward end line Y which is perpendicular to the axis X and which passes through the forward end of the rounded cutting edge 137, and an angle $\theta_2$ of the nose cutting edge 135 with respect to the imaginary forward end line Y are set to 5° to 15°. In the illustrated embodiment, $\theta_1$ is set to 8°, and $\theta_2$ is set to 12°.

The radially outward insert 126 is so arranged that one of the side cutting edges 134 and the adjacent nose cutting edge 135 located radially outwardly of the side cutting edge 134 through the intermedium of the corresponding rounded cutting part 137 serve as an end cutting edge, and the rounded cutting part 137 is located forwardly of the adjacent side and nose cutting edges 134 and 135 with reference to the axis X. In addition, the radially outward insert 126 is also arranged such that the nose cutting edge 135, which is located adjacent the nose cutting edge 135 serving as the end cutting edge, through the intermedium of the nose rounded cutting edge 136, extends so as to approach the axis X as the nose cutting edge 135 approaches the rearward end of the tool body 121. It is desirable, like the radially inward insert 127, that an angle $\theta_1$ of the side cutting edge 134 with respect to the above-mentioned imaginary forward end line Y and an angle $\theta_2$ of the nose cutting edge 135 with respect to the imaginary forward end line Y are set to 5° to 15°. In the illustrated embodiment, $\theta_1$ is set to 8°, and $\theta_2$ is set to 12°. It is also desirable that a clearance angle $\epsilon$ defined between a line parallel to the axis X and the nose cutting edge 135 which is located adjacent the nose cutting edge 135 serving as the end cutting edge, through the intermedium of the nose rounded cutting part 136, is set to 0° to 5°. In the illustrated embodiment, the clearance angle is set to 2°.

The radially outward and inward inserts 126 and 127 are arranged such that the side cutting edge 134 of the radially inward insert 127, which serves as the end cutting edge, is intersected at a point of intersection P with the side cutting edge 134 of the radially outward insert 126, which serves as the end cutting edge. As are the cases with the previous embodiments, the radially outward and inward inserts 126 and 127 are positioned such that, assuming that a radial distance between the point of intersection P and the radially outermost end of the end cutting edge of the radially outward insert 126 is A, and a radial distance between the point of intersection P and the radially innermost end of the end cutting edge of the radially inward insert 127 is B as shown in FIG. 17, the ratio of A/B is equal to 2/8 to 45/55.

Figure 19:
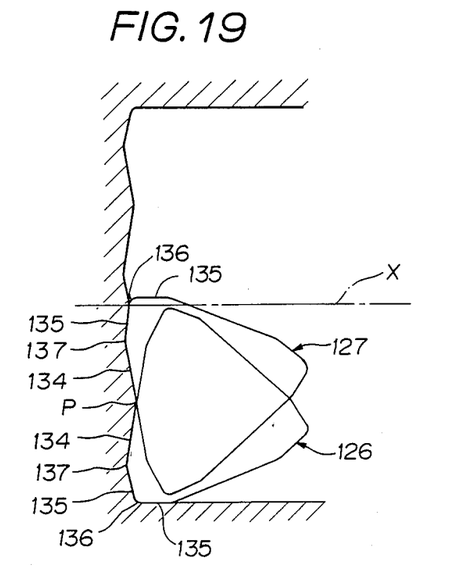
FIG. 19 is a cross-sectional view showing the inserts illustrated in FIG. 13, with a bore being formed by the inserts.

FIG. 19 illustrates the insert boring tool 102 which is arranged as described above and is performing a boring. As will be seen from FIG. 19, what portions of the radially inward insert 127 are offered to the actual cutting are the nose cutting edge 135 serving as the end cutting edge, the adjacent rounded cutting part 137 located radially outwardly of the nose cutting edge 135, and a portion of the adjacent side cutting edge 134 located radially outwardly of the rounded cutting part 137, which portion extends from the rounded cutting part 137 to the point of intersection P. The nose rounded cutting part 136, which is located adjacent the nose cutting edge 135 serving as the end cutting edge and which is located in an over-centered fashion, is not offered to the cutting. What portions of the radially outward insert 126 are offered to the actual cutting are a portion of the side cutting edge 134 serving as the end cutting edge, which portion is located radially outwardly of the point of intersection P, the rounded cutting part 137 located radially outwardly of the side cutting edge 134, the adjacent nose cutting edge 135 located radially outwardly of the rounded cutting part 137, and the adjacent nose rounded cutting part 136 located radially outwardly of the nose cutting edge 135.

Figure 20:
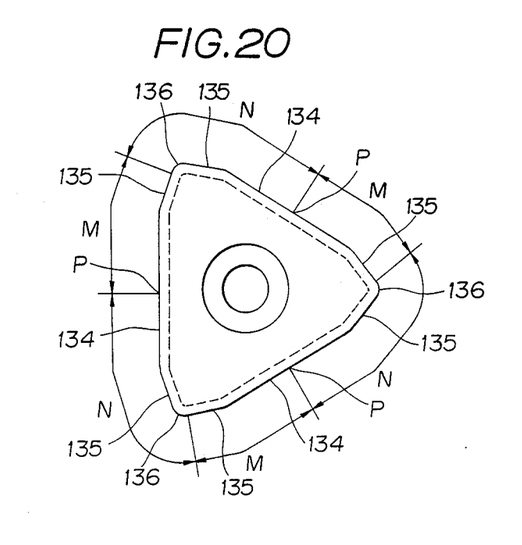
FIG. 20 a plan view of one of the inserts illustrated in FIG. 13, showing regions of the insert participating in the cutting.

Thus, if the radially inward insert 127 is angularly moved through 120° about its axis extending perpendicularly to the upper and lower surfaces 131 and 132, to effect the cutting edge replacement three times, the cutting edges represented respectively by regions M in FIG. 20 are successively offered to the cutting. If the radially outward insert 126 is likewise angularly moved to effect the cutting edge replacement three times, the cutting edges represented respectively by regions N in FIG. 20 are successively offered to the cutting. In this manner, the cutting edge regions offered to the cutting when the cutting edge replacement is effected three times with respect to the radially inward insert 127 do not overlap with the cutting edge regions offered to the cutting when the cutting edge replacement is effected three times with respect to the radially outward insert 126.

It is, therefore, possible for the above-described insert boring tool 102 to effect the cutting edge replacement six times with respect to a single same insert, including effecting the cutting edge replacement thrice with respect to the insert as the radially outward insert 126 and effecting the cutting edge replacement thrice with respect to the same insert as the radially inward edge 127. This makes it possible to increase the efficiency in use of the insert.

Figure 21:
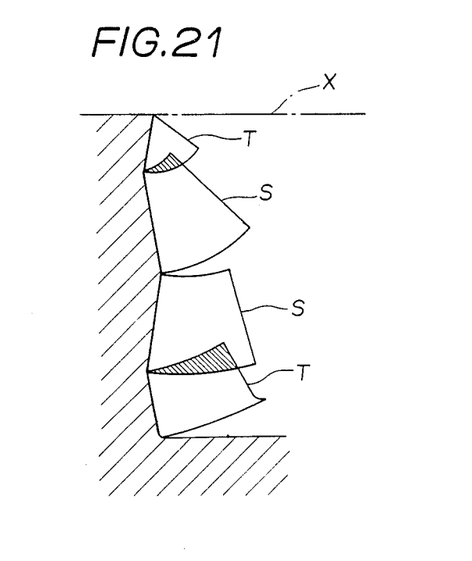
FIG. 21 is a cross-sectional view showing chips being produced.

Furthermore, in the above-described insert boring tool 102, each side cutting edge 134 and the adjacent nose cutting edge 135 of each of the radially outward and inward inserts 126 and 127 are formed in an outwardly convex fashion. Therefore, as shown in FIG. 21, chips S produced by the side cutting edges 134 and chips T produced by the nose cutting edges 135 interfere with each other, so that breaking of the chips is promoted, thus making it possible to increase the efficiency of chip discharge. Further, since the cutting width can be divided into four sections corresponding respectively to the cutting edges, the cutting resistance can be reduced. Moreover, since the angle of inclination $\theta_1$ of each side cutting edge 134 is set to 8° and the angle of inclination $\theta_2$ of each nose cutting edge 135 is set to 12°, radial component forces applied respectively to the cutting edges can be balanced with each other, so that cutting balance can be made superior.

Figure 22:
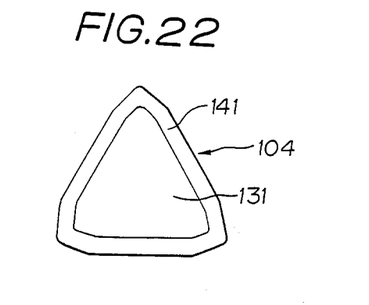
FIG. 22 is a plan view showing a modification of the inserts illustrated in FIG. 15.
Figure 23:
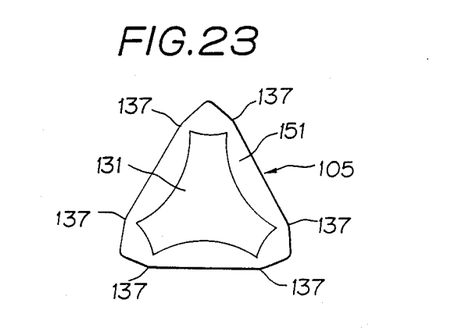
FIG. 23 is a view similar to FIG. 22, but showing another modification of the inserts illustrated in FIG. 15.
Figure 24:
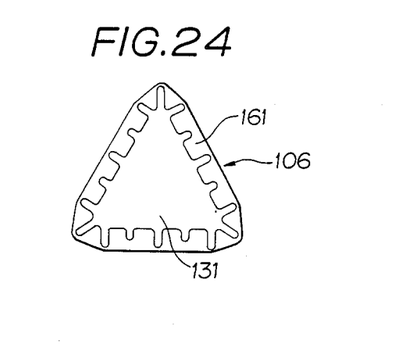
FIG. 24 is a view similar to FIG. 22, but showing still another modification of the inserts illustrated in FIG. 15.

The third embodiment illustrated in FIGS. 13 through 21 has been described as employing the radially outward and inward inserts 126 and 127 in each of which the upper surface 131 serving as a face is planar. However, the invention should not be limited to this specific form. A chip breaking area may be provided along the outer periphery of the upper surface 131. That is, an insert 104 shown in FIG. 22 has a chip breaking area 141 which has a constant width and which is formed in the upper surface 131 along the outer peripheral cutting edges. A cutting insert 105, as shown in FIG. 23, has a chip breaking area 151 which is formed in the upper surface 131 and which is narrow in width in the vicinity of each rounded cutting part 137, but is wide in width in the remaining portion. A cutting insert 106 shown in FIG. 24 has a chip breaking area 161 which is formed in the upper surface 131 and in which portions narrow in width from the outer peripheral cutting edges and portions wide in width therefrom are arranged alternately.

As described above, the radially outward and inward inserts of the insert boring tool according to the invention is positioned such that, assuming that in the loci of rotation of the respective radially outward and inward inserts, the radial distance between the radially outermost end of the end cutting edge of the radially outward insert and the point of intersection at which the end cutting edges of the respective radially outward and inward inserts are intersected with each other is A, and the radial distance between the radially innermost end of the radially inward insert and the point of intersection is B, the ratio of A:B is within the range of 2:8 to 45:55. Namely, since the radially outward insert is disposed so that that portion of the end cutting edge which actually cuts a workpiece has a length of no greater than a prescribed upper limit, the back force acting on the radially outward insert can be reduced to some extent, thus enabling the principal forces acting respectively on the radially outward and inward inserts to be balanced with each other. Consequently, the boring tool in accordance with the present invention can solve various shortcomings caused by a marked difference of cutting force between the radially inward and outward inserts, thus making it possible to increase the boring accuracy, the finished surface roughness and the bore straightness and also to improve the boring depth limit.

What is claimed is:

1. An insert boring tool comprising:
a tool body having an axis of rotation therethrough;

a radially outward cutting insert in the form of a polygon as viewed in plan, said radially outward insert being mounted on a forward end of said tool body and located adjacent an outer periphery of said forward end, said radially outward insert having at least one end cutting edge; and a radially inward cutting insert in the form of a polygon as viewed in plan, said radially inward insert being mounted on said forward end of said tool body and located adjacent said axis of said tool body, said radially inward insert having at least one end cutting edge, each of said radially outward and inward inserts being generally in the form of a regular triangle and each having substantially identical dimensions.

wherein said radially outward and inward inserts are arranged such that said end cutting edge of said radially outward insert is intersected at a point of intersection with said end cutting edge of said radially inward insert, in loci of rotation of the respective radially outward and inward inserts in a plane containing the axis of said tool body, and wherein said radially outward and inward inserts are positioned such that, assuming that a radial distance between said point of intersection and a radially outermost end of said end cutting edge of said radially outward insert is A, and a radial distance between said point of intersection and a radially innermost end of said end cutting edge of said radially inward insert is B, a ratio of A/B takes a value of from 2/8 to 45/55.

2. An insert boring tool as defined in claim 1, wherein said radially innermost end of said end cutting edge of said radially inward insert is located substantially on said axis of said tool body.

3. An insert boring tool as defined in claim 1, wherein said radially innermost end of said end cutting edge of said radially inward insert is located beyond said axis of said tool body in an over-centered fashion.

4. An insert boring tool comprising:

a tool body having an axis of rotation therethrough;

a radially outward cutting insert in the form of a polygon as viewed in plan, said radially outward insert being mounted on a forward end of said tool body and located adjacent an outer periphery of said forward end, said radially outward insert having at least one end cutting edge; and a radially inward cutting insert in the form of a polygon as viewed in plan, said radially inward insert being mounted on said forward end of said tool body and located adjacent said axis of said tool body, said radially inward insert having at least one end cutting edge, wherein said radially outward and inward inserts are arranged such that said end cutting edge of said radially outward insert is intersected at a point of intersection with said end cutting edge of said radially inward insert, in loci of rotation of the respective radially outward and inward inserts in a plane containing the axis of said tool body, and wherein said radially outward and inward inserts are positioned such that, assuming that a radial distance between said point of intersection and a radially outermost end of said end cutting edge of said radially outward insert is A, and a radial distance between said point of intersection and a radially innermost end of said end cutting edge of said radially inward insert is B, a ration of A/B takes a value of from 2/8 to 45/55;

wherein said radially outward and inward inserts are positive cutting inserts identical in dimension and configuration with each other and generally in the form of a regular triangle as viewed in plan, wherein each of said positive cutting inserts has a side cutting edge formed at each of three sides of regular triangle, a pair of adjacent nose cutting edges formed in a V-shape at each of the apexes of said regular triangle, the pair of adjacent nose cutting edges being in symmetrical relation to a bisector of the apex and defining an angle larger than an apex angle of said regular triangle, and a nose rounded cutting part formed at an intersection between the pair of adjacent nose cutting edges, wherein, i said radially inward insert, each of said side cutting edges and the adjacent nose cutting edge located radially inwardly at the side cutting edge serve as said end cutting edge of said radially inward insert, and the nose rounded cutting part located adjacent the nose cutting edge serves as said end cutting edge and is positioned beyond said axis of said tool body displaced from said axis of rotation, an wherein, in said radially outward insert, each of said side cutting edges and the adjacent nose cutting edge located radially outwardly of the side cutting edge serve as said end cutting edge of said radially outward insert, and the nose cutting edge located adjacent the nose cutting edge serves as said end cutting edge, through the intermediary of the nose rounded cutting part and extends so as to approach said axis of said tool body as the nose cutting edge approaches a rearward end of said tool body.

5. An insert boring tool as defined in claim 4, wherein each of said radially outward and inward inserts has an upper surface serving as a face, a lower surface parallel to said upper surface and serving as a seat face against said forward end of said tool body, and a side surface extending between said upper and lower surfaces and serving as a flank.

6. An insert boring tool as defined in claim 5, wherein said upper surface is planar.

7. An insert boring tool as defined in claim 5, wherein said upper surface is formed with a chip breaking area which extends along a periphery of said upper surface and has substantially a constant width.

8. An insert boring tool as defined in claim 5, wherein said upper surface is formed with a chip breaking area which extends along a periphery of said upper surface and which is narrow in width in the vicinity of a junction between each side cutting edge and the adjacent nose cutting edge, but is wide in width in the remaining portion.

9. An insert boring tool as defined in claim 5, wherein said upper surface is formed with a chip breaking area which extends along a periphery of said upper surface and in which portions narrow in width and portions wide in width are arranged alternately.

10. An insert boring tool as defined in claim 4, wherein the side cutting edge serving as said end cutting edge of each of said radially outward and inward inserts, defines an angle $\theta_1$ with respect to an imaginary forward end line extending perpendicularly to said axis of said tool body and passing through a junction between the side cutting edge and the adjacent nose cutting edge serving as said end cutting edge, and the nose cutting edge, serving as said end cutting edge, defines an angle $\theta_2$ with respect to said imaginary forward end line, said angle $\theta_1$ being 5° to 15°, and said angle $\theta_2$ being 5° to 15°.

* * * * *